(12) United States Patent
Kong

(10) Patent No.: US 7,174,886 B2
(45) Date of Patent: Feb. 13, 2007

(54) SAFETY APPARATUS FOR PORTABLE GAS RANGE AND METHOD FOR OPERATING THE SAME

(76) Inventor: Sang Shik Kong, 2-1 Yongjin-Ri, Boksoo-Myun, Kumsan-Kun, Chung Cheong Nam Do (KR)

(*) Notice: Subject to any disclaimer, the term of this patent is extended or adjusted under 35 U.S.C. 154(b) by 214 days.

(21) Appl. No.: 10/898,670

(22) Filed: Jul. 23, 2004

(65) Prior Publication Data
US 2005/0028804 A1 Feb. 10, 2005

(30) Foreign Application Priority Data
Jul. 25, 2003 (KR) .................... 10-2003-0051263

(51) Int. Cl.
*F24C 3/08* (2006.01)
*F24C 3/12* (2006.01)
(52) U.S. Cl. .......................... 126/42; 126/40
(58) Field of Classification Search ............. 126/42 O, 126/40 X, 351.1; 431/153
See application file for complete search history.

(56) References Cited
U.S. PATENT DOCUMENTS
6,202,640 B1 * 3/2001 Naperola et al. ......... 126/41 R

FOREIGN PATENT DOCUMENTS
KR 2001-0008025 2/2001

* cited by examiner

Primary Examiner—Alfred Basichas
(74) Attorney, Agent, or Firm—Ladas & Parry LLP (57) ABSTRACT

There is provided a safety apparatus for a portable gas range, by which safety measures are conducted before an internal pressure of a canister is rapidly increased to an abnormal high pressure due to radiant heat or the like in use to prevent the canister from being overheated and thus obviate explosion of the canister, and a method for operating the safety apparatus. When the internal pressure of the canister reaches a predetermined pressure P0 just below a danger pressure P1, a desired amount of gas is discharged from the canister to a burner for combustion of the gas by operating a safety operating member 11 urged by a resilient spring S0, thereby maintaining the canister at a low pressure. If the low pressure is continuously maintained, the gas range is returned to its original combustion state, and the process is repeated, thereby improving a thermal efficiency of the gas range using the combustion of the gas. In addition, if the internal pressure of the canister is rapidly increased above the pressure P0, the canister is automatically detached from the gas inlet by operating a safety rod 13 urged by a resilient spring S1, as subsequent safety measures.

14 Claims, 9 Drawing Sheets

[FIG. 1]

Prior Art

[FIG. 2a]

Prior Art

[FIG. 2b]

Prior Art

[FIG. 3a]

Prior Art

[FIG. 3b]

Prior Art

[FIG. 4]

Prior Art

SAFETY APPARATUS FOR PORTABLE GAS RANGE AND METHOD FOR OPERATING THE SAME

CROSS-REFERENCE TO RELATED APPLICATION

This application claims the benefit of Korean Patent Application No. 2003-0051263, filed Jul. 25, 2003, the disclosure of which is hereby incorporated herein by reference in its entirety.

BACKGROUND

1. Technical Field

The present invention relates to a safety apparatus for a portable gas range, and more particularly, to a safety apparatus, by which safety measures are conducted before an internal pressure of a canister is rapidly increased to an abnormal high pressure due to radiant heat or the like in use to prevent the canister from being overheated and thus obviate a resulting explosion of the canister. Also, the present invention relates to a method for operating the safety apparatus.

2. Discussion of the Related Art

Figure 1:
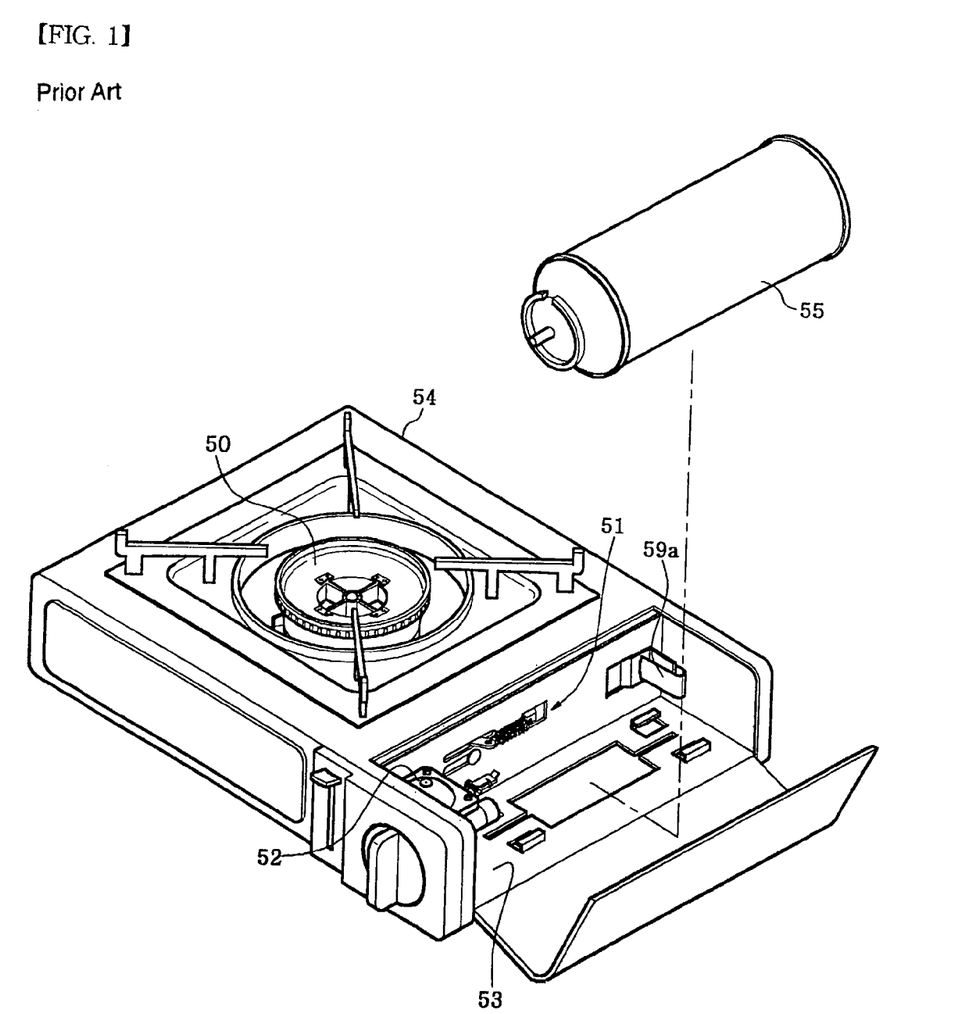
FIG. 1 is a perspective view of a conventional portable gas range.

A common portable gas range includes, as shown in FIG. 1, a burner 50 with an igniter, a device 51 for mounting/demounting a canister 55 to or from the gas range, a canister receptacle 53 having a gas inlet to be coupled to the canister 55 and a regulator 52 for controlling the discharge of a gas supplied to the burner 50 through the gas inlet, and a case 54 for enclosing and securing the components. The burner 50 is adapted to be connected to the regulator 52 via an air mixing pipe (indicated by reference numeral 103 in FIG. 7)

Such a portable gas range is widely used to easily cook food in indoors or outdoors, because of their light weight and convenient portability. The canister (i.e., gas container) contains therein butane gas under a gas pressure of 2 $kg/cm^2$ to 3 $kg/cm^2$ (2 $kg/cm^2$ for Japan). Consequently, the canister is always attended by the risk of a safety accident, such as explosion or fire, caused by a careless user or external thermal source (for example, radiant heat).

It is described in a provision of Korean LPG Safety Control Act a gas container must have a safety apparatus capable of automatically cutting off a gas supply in a pressure range of 5 $kg/kg/cm^2$ to 7 $kg/kg/cm^2$, which is regarded as a danger pressure, when the internal pressure of the gas container is rapidly increased to the abnormal high pressure, in order to prevent the safety accident.

A typical safety apparatus comprises a detachable safety apparatus, by which when the internal pressure of the gas container is increased in a pressure range of 5 $kg/cm^2$ to 7 $kg/cm^2$ (4 $kg/cm^2$ to 6 $kg/cm^2$ for Japan), which is regarded as a danger pressure below an explosion critical pressure, the gas supply is interrupted by automatically releasing the gas container from the gas inlet using the increased pressure, and a flow path cutoff safety apparatus, by which when the internal pressure of the gas container is increased in a pressure range of 5 $kg/cm^2$ to 7 $kg/cm^2$, which is regarded as a danger pressure, a gas flow path formed in a regulator is automatically interrupted by the increased pressure to stop the gas supply.

The detachable safety apparatus is adapted to operate in cooperation with the canister attaching/detaching device installed to the canister receptacle of the gas range and a safety rod received in a housing under the regulator.

A prior art detachable safety apparatus will now be described in detail with reference to FIGS. 1 and 2.

The canister mounting/demounting device 51 slidably mounts/demounts the canister 55 to/from the gas inlet of the regulator 52, and includes a canister receptacle 53 for receiving the canister 55, an operating link 58 with one end portion protruded outwardly from the canister receptacle 53 and engaged to a partition 56 in the burner 50 by a hinge axis 57 to for a handle 58a and the other end portion formed with a guide groove 58b, and a slide link 59 with one end portion engaged to the guide groove 58b and the other end portion formed with seat 59a and slidably moved thereon. A compression spring 60 is installed to the operating link 58 using the partition 56 as a supporting point.

Figure 2A:
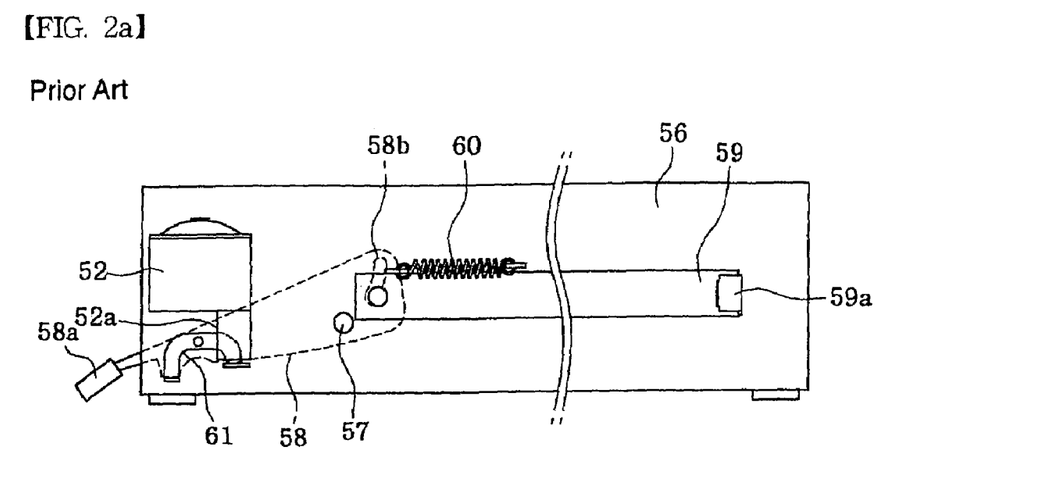
FIGS. 2A and 2B are side views illustrating an operating state of a safety rod of a regulator in FIG. 1.
Figure 2B:
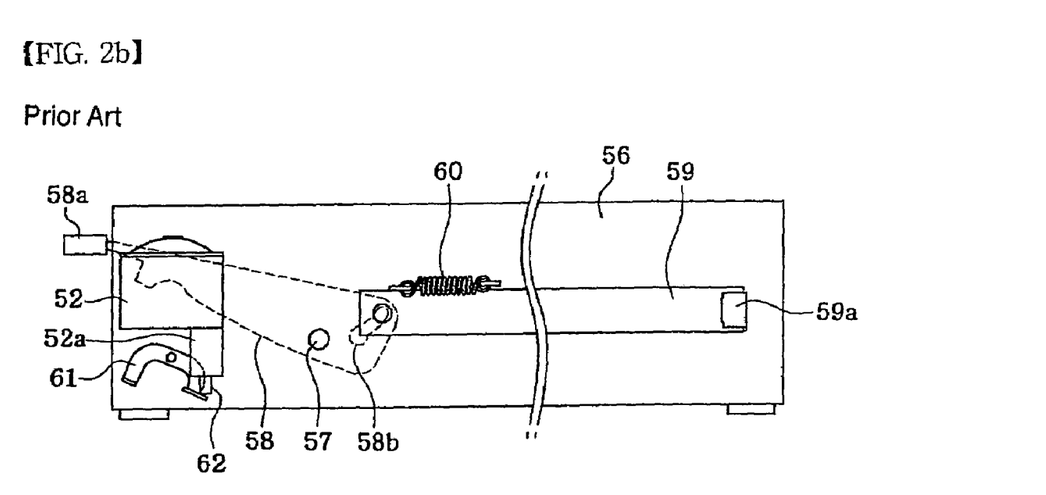

When a user pushes down the handle 58a, as shown in FIG. 2A, with the canister 55 seated on the canister receptacle 53, the compression spring 60 is stretched, such that the canister 55 is moved toward the operating link 58 by the slide link 59 to engage with the gas inlet of the regulator 52. In this state, the operating link 58 is moved upward, and the seat 59a is moved backward together with the slide link 59 by a restoring force of the compression spring 60, such that the canister 55 is detached from the gas inlet.

A releasing lever 61 is hingedly engaged to the partition 56 at a lower position of the operating link 58.

As such, the safety rod 62 which is resiliently installed in the housing 52a at a lower position of the regulator 52 by a resilient spring (not shown) is adapted to automatically detach the canister 55 in cooperation with the releasing lever 61, when the internal pressure of the canister 55 is increased to the abnormal high pressure.

Specifically, the canister 55 is engaged to the gas inlet of the regulator 52, in use. If the canister 55 is overheated and thus the gas pressure reaches a level of 5 $kg/kg/cm^2$ to 7 $kg/kg/cm^2$, the safety rod 62 automatically protrudes from the lower portion of the housing 52a by the increased pressure to push one end portion of the releasing lever 61 displaced under the safety rod. At this time, the other end portion of the releasing end portion 61 is moved upward to lift the operating link 58 upwardly. In result, the slide link 59 is moved backward by the restoring force of the compression spring 60, such that the canister 55 is automatically detached from the gas injection port of the regulator 52, thereby interrupting the gas supply to the burner 50 and thus preventing the explosion of the canister.

With the conventional detachable safety apparatus, only when the gas pressure introduced into the regulator through the gas inlet reaches the level of danger pressure, 5 $kg/cm^2$ to 7 $kg/cm^2$, in the state where the canister is overheated, the safety rod is adapted to interrupt the gas supply. Consequently, the safety apparatus cannot prevent the overheating of the canister. In other words, the safety apparatus operates immediately before the canister blows up. Therefore, there is a problem in that the apparatus still contains a radically accident danger such as explosion or fire.

Figure 3A:
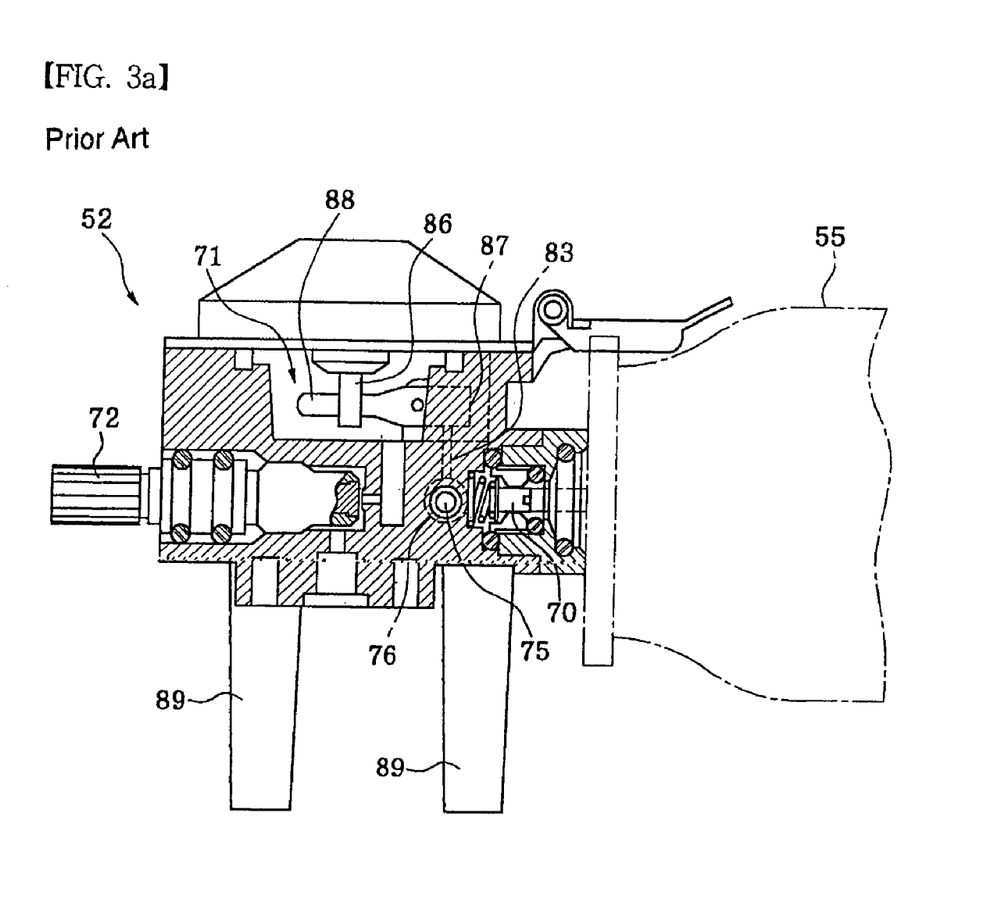
FIGS. 3A and 3B are a side cross-sectional view and a front cross-sectional view illustrating one example of a conventional safety apparatus for a portable gas range.
Figure 3B:
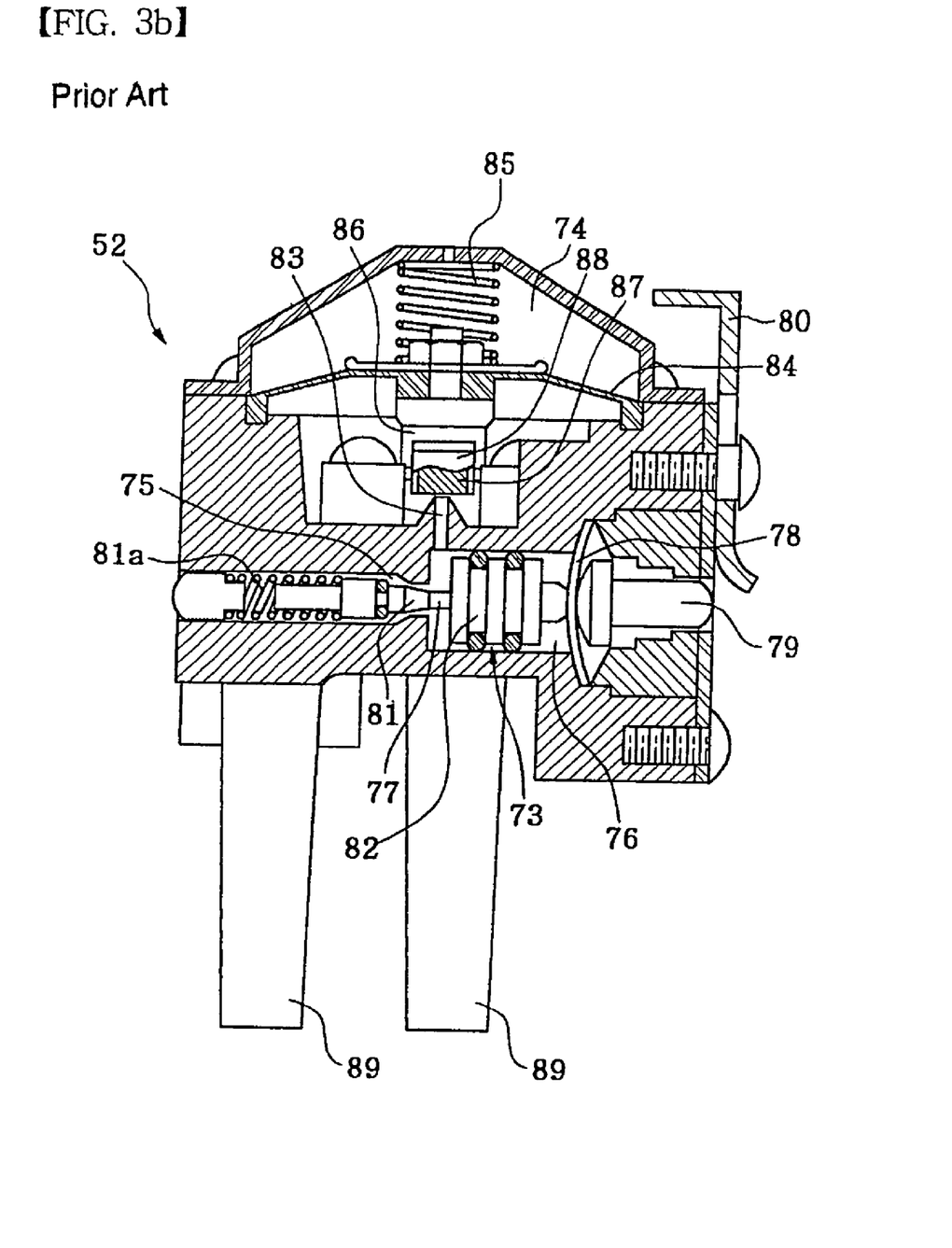

FIGS. 3A and 3B are a side cross-sectional view and a front cross-sectional view illustrating one example of a conventional flow path cutoff safety apparatus, respectively.

As shown in FIGS. 3A and 3B, the flow path cutoff safety apparatus includes a gas inlet 70 detachably engaged to a canister 55, a chamber 71 for keeping a gas pressure supplied to a burner at a constant level, and an adjusting lever 72 for adjusting an amount of the gas supplied to the burner. Gas cutoff means 73 is installed in a gas flow path defined by the gas inlet 70 and the chamber 71, and cuts off the gas flow path when the gas pressure is increased to a predetermined level. The chamber 71 is provided with pressure regulating means 74 for regulating the gas pressure supplied to the burner at a constant level.

The gas cutoff means 73 includes a tapered hole 75 gradually decreased in diameter from the gas flow path to a rear, a cylinder hole 76 straightly communicated with the tapered hole 75, a breaking valve 77 installed in the tapered hole 75 and the cylinder hole 76 and moved rearward by the gas pressure, and a leaf spring 78 biasing a rear of the braking valve 77.

The leaf spring 78 is adjoined a return valve 79 with one end portion exposed outwardly. A return lever 80 is installed on an upper portion of the exposed end, and is slid up and down to push the return valve 79 forwardly.

The breaking valve 77 includes a cutoff portion 81 displaced at a front of the tapered hole 75 and an operating portion 82 displaced at the cylinder hole 76. The cutoff portion 81 is provided on an outer periphery thereof with an O-ring for sealing the tapered hole 75 when it is moved rearward. The operating portion 82 is provided on an outer periphery thereof with O-ring for preventing leakage of the gas pressure. In addition, a nozzle hole 83 is formed at one side of the cylinder hole 76 at the front of the operating portion 82, and is communicated with the nozzle hole 83.

The pressure regulating means 74 includes a rubber plate 83 installed to an upper portion of the chamber 71 to seal the chamber, a spring 85 for urging the rubber plate 84 downwardly, a needle holder 86 connected to the rubber plate 84, and a needle valve 88, of which a center portion is hingedly engaged to a body in such a way that one end portion of the needle valve is engaged to the needle holder 86 and the other end portion is provided with a stopper 87. Reference numeral 89 denotes a support secured to a bottom surface of the canister receptacle.

As such, when the user ignites the gas range, the gas filled in the chamber 71 is supplied to the burner, and the gas pressure in the chamber 71 is lowered. Then, the rubber plate 84 is pushed down by the spring 85, such that the needle valve 88 hingedly engaged to the regulator 52 is spaced apart from the nozzle hole 83 to introduce the gas from the canister to the chamber 71. If the gas pressure introduced into the chamber 71 is increased to a predetermined level, the rubber plate 84 is lifted up against the biasing force of the spring 85 to rotate the needle valve 88 and thus cutoff the nozzle hole 83. In addition, when the gas pressure is increased to a predetermined level due to the overheating of the canister 55, the breaking valve 77 installed to the gas flow path is moved backward against the biasing force of the leaf spring 78 by the gas pressure to close the tapered hole 75, so that the gas supply is interrupted to put out a flame of the burner.

However, according to the conventional flow path cutoff safety apparatus shown in FIG. 3, it is required to precisely machine related components to completely cutoff the gas flow path. If it is not precisely machined, an accident may occur. In addition, even though the related components have been precisely machined, the gas remains in the cutoff gas flow path. Consequently,there is a serious problem in that the canister may explode in the case the canister is overheated.

In order to solve the above problem, an improved flow path cutoff safety apparatus is disclosed in Korean Patent Unexamined Publication No. 2001-0008025, in which when the gas pressure is increased to a predetermined level due to the overheating of the canister, the gas in the canister is outwardly discharged, so as to prevent the explosion of the canister.

Figure 4:
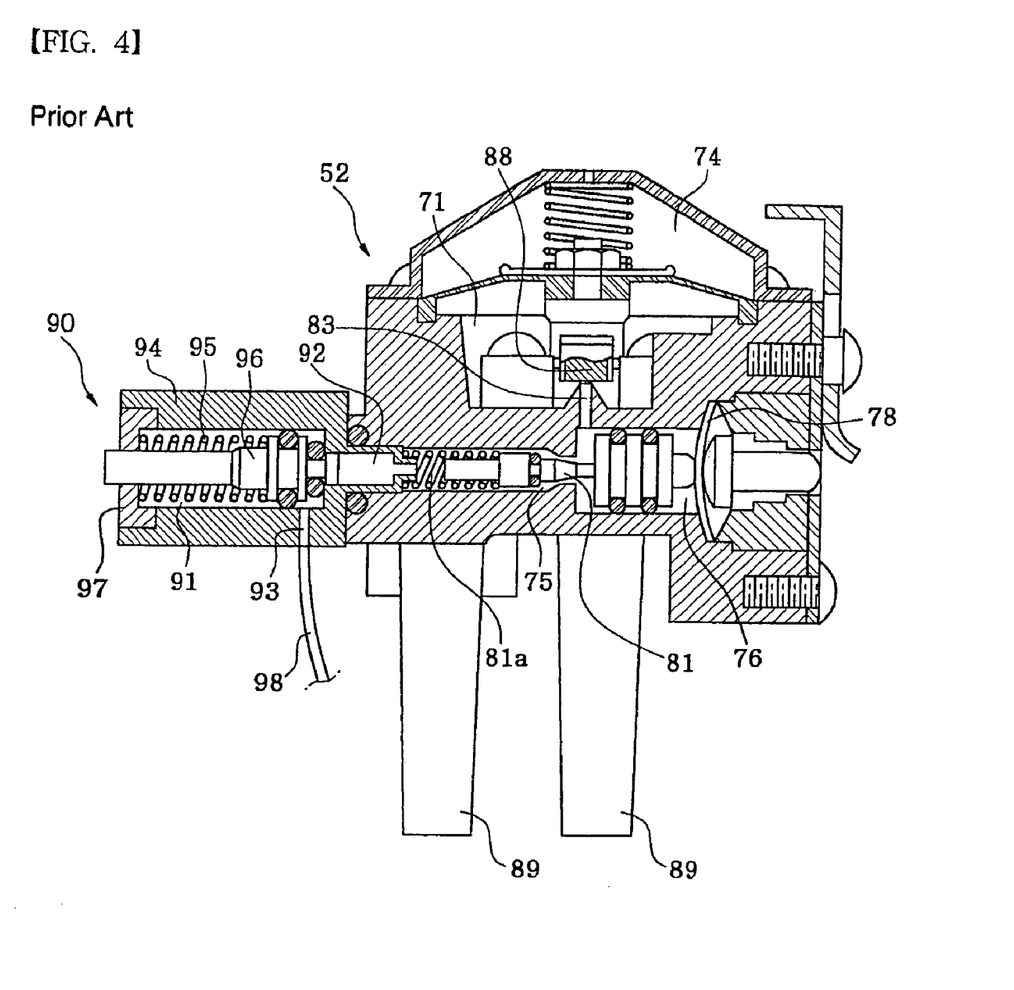
FIG. 4 is a front cross-sectional view illustrating another example of a conventional safety apparatus.

FIG. 4 is a front cross-sectional view of a conventional flow path cutoff safety apparatus.

As shown in FIG. 4, a gas discharging means 90 includes a cylinder hole 91, a through hole 92 formed at one side of the cylinder hole 91 to communicate with a gas flow path, a housing 94 provided at a circumferential surface of the through hole 92 with a discharging hole 93 for discharging outwardly the gas flowed toward the through hole 92, and a safety rod 96 resiliently supported by a spring 95 to be closely adjacent to the through hole 92. A disc-shaped cap 97 is threadedly engaged to one end portion of the housing 94, and a nozzle 98 outwardly extended is engaged to the discharging hole 93.

With the construction as described above, if the chamber 71 is filled with the gas above a predetermined level of pressure, the nozzle hole 83 is cut off by the needle valve 88 of the pressure regulating means 74 so as to primarily interrupt the gas to be supplied to the chamber 71, as described above with reference to FIG. 3. In this cutoff state, if the gas pressure is continuously increased above a predetermined level due to the overheating of the canister, the gas supply is secondarily cut off by the operation of the gas cutoff means 73 to put out a flame of the burner.

In this circumference, even though a fire breaks out around the gas range or the gas pressure is increased to above predetermined level, for example, 13 kg/cm$^2$ to 15 kg/cm$^2$, due to the latent heat accumulated in the gas range or canister, the safety rod 96 of the gas discharging means 90 is moved backward against the biasing force of the spring 95 to open the through hole 92, so that the gas in the canister is outwardly discharged through the nozzle 98. Therefore, even though the canister is continuously overheated, it does not explode.

However, the flow path cutoff safety apparatus has some problems as follows:

First, the housing 94 provided with the safety rod 96 extends from the tapered hole 75 and protrudes from the side of the regulator 52 such that the through hole 92 is opened or closed by the safety rod 96 operated by the spring 95. Therefore, the volume of the regulator is increased, and moreover the construction is complicated. In addition, since the internal structure of the general portable gas range is remarkably altered, its productivity is lowered and its manufacturing cost is increased.

Second, since the discharging hole 93 is formed in the interior of the regulator, a separate nozzle 98 has to be provided to discharge the gas outwardly.

Third, since the gas is discharged outwardly through the discharging hole 93, there is a problem of causing a secondary fire accident in the case where flammable gas is displaced in the vicinity of the gas range via nozzle 98.

Finally, as similar to the prior art related with FIG. 3, it is necessary to precisely machine the related components in order to completely cut off the gas flow path.

SUMMARY OF THE INVENTION

The present invention provides a safety apparatus for a portable gas range. The safety apparatus has a housing connected to one side of a gas flow path in a regulator, the housing having an internal path communicating with a through hole connected to a lower portion of a gas flow path in the regulator. A safety rod is resiliently held in the internal path by a first resilient spring, and when an internal pressure of a gas canister increases to a danger pressure, an end portion of the safety rod is caused to protrude outwardly through a hole formed at a lower portion of the housing. A safety operating member installed between a through hole and an upper portion of the safety rod, resiliently supported by a second resilient spring having a resilient force lower than that of the first resilient spring, and operated by a gas pressure higher than a charge pressure of the canister and lower than the danger gas pressure.

Another object of the present invention is to provide a safety apparatus for a portable gas range and a method for operating the safety apparatus, by which after preliminary safety measures, if an internal pressure of a canister is rapidly increased to a level higher than a pressure of the gas discharged into a burner, the canister is automatically detached from a gas inlet, as a preliminary safety measure, thereby obviating explosion of the canister.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 6 shows an operating state of the safety apparatus in FIG. 5, in which

DETAILED DESCRIPTION OF THE INVENTION

The present invention will now be described more fully hereinafter with reference to the accompanying drawings, in which preferred embodiments of the invention are shown.

A safety apparatus for a portable gas range according to the present invention includes a housing 101 connected to one side of a gas flow path in a regulator 52 and operated above the highest level of a common pressure or below the lowest level of a danger pressure, P0, a gas discharging path 25 connected to one side of the housing 101 for discharging a gas, and an auxiliary gas discharging pipe 26 connected in series to a main gas discharging pipe 104 and having a gas discharging nozzle 27, in which the main gas discharging pipe 104 has one end connected to the gas discharging path 25 and the other end installed to an air mixing pipe 103.

The portable gas range according to the present invention includes, as shown in FIGS. 1 to 4, a burner 50 with an igniter, a device 51 for mounting/demounting a canister 55 to or from the gas range, and a canister receptacle 53 having a regulator 52 for controlling a discharging amount of the gas supplied to the burner 50 in cooperation with an adjusting lever 72, except for components composing a safety apparatus. The construction of the regulator 52 is identical to that of a conventional portable gas range, in which the burner 50 is adapted to be connected to the regulator 52 via an air mixing pipe (indicated by reference numeral 103 in FIG. 7). In the accompanying drawings, therefore, like parts are indicated by the same reference numerals, the description of which will be omitted herein.

Figure 5:
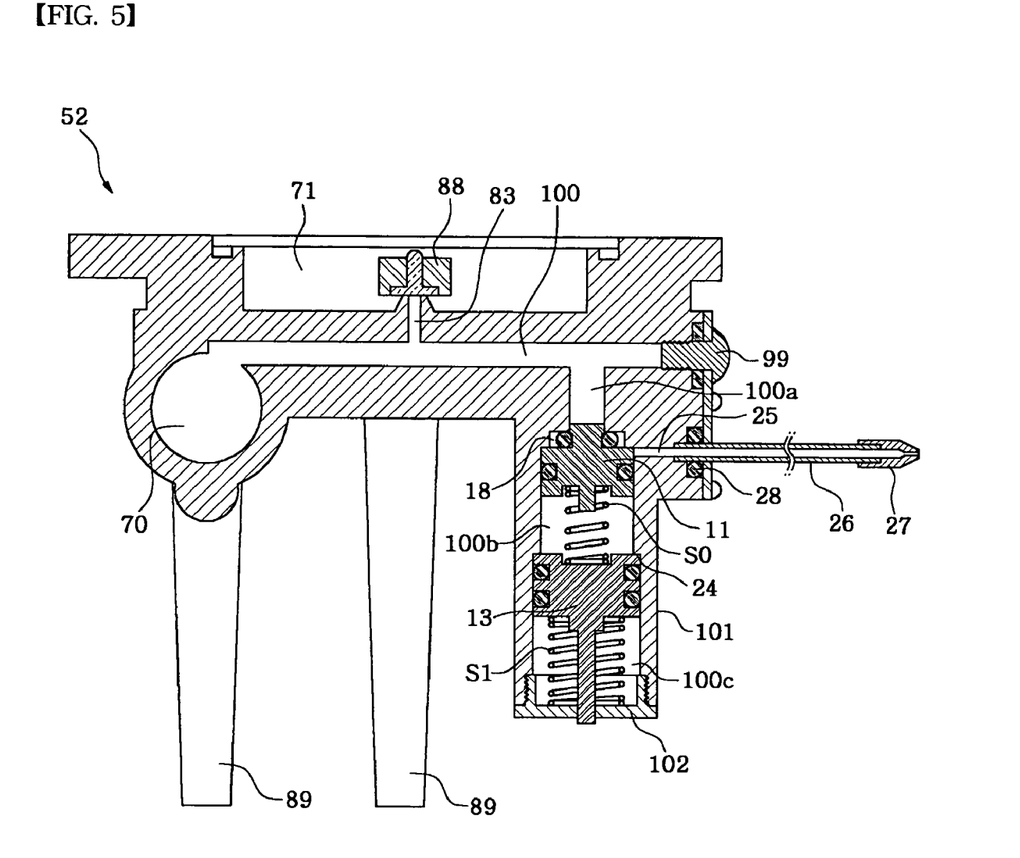
FIG. 5 is a longitudinal cross-sectional view of a safety apparatus for a portable gas range according to one preferred embodiment of the present invention.

FIG. 5 is a longitudinal cross-sectional view of the safety apparatus for the portable gas range according to the present invention. FIG. 6 shows an operating state of the safety apparatus in FIG. 5. FIG. 7 is a perspective view illustrating a main part of the portable gas range according to the present invention.

Figure 6A:
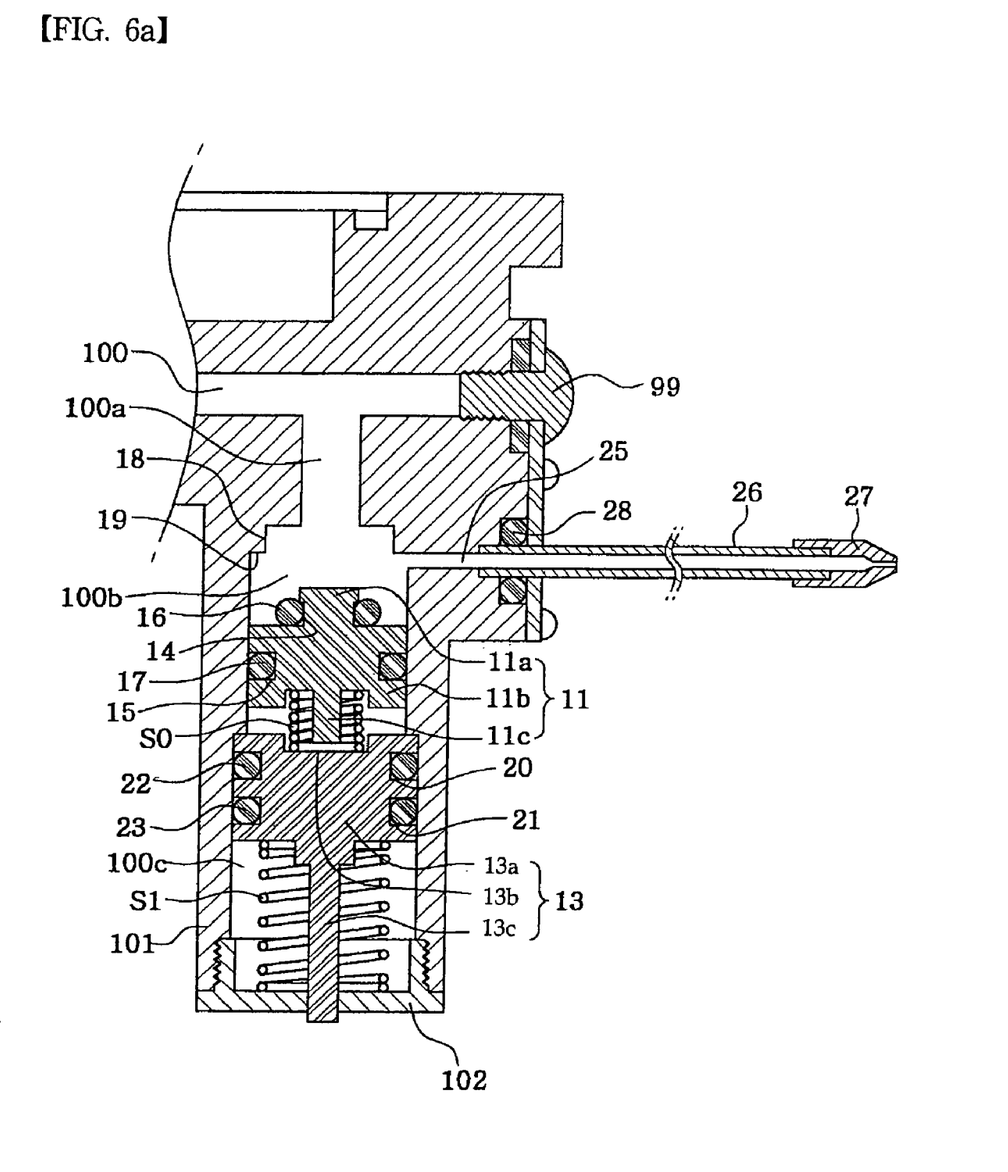
FIG. 6A is a longitudinal cross-sectional view illustrating an operating state of a safety operating member and FIG. 6B is a longitudinal cross-sectional view illustrating an operating state of a safety rod.
Figure 6B:
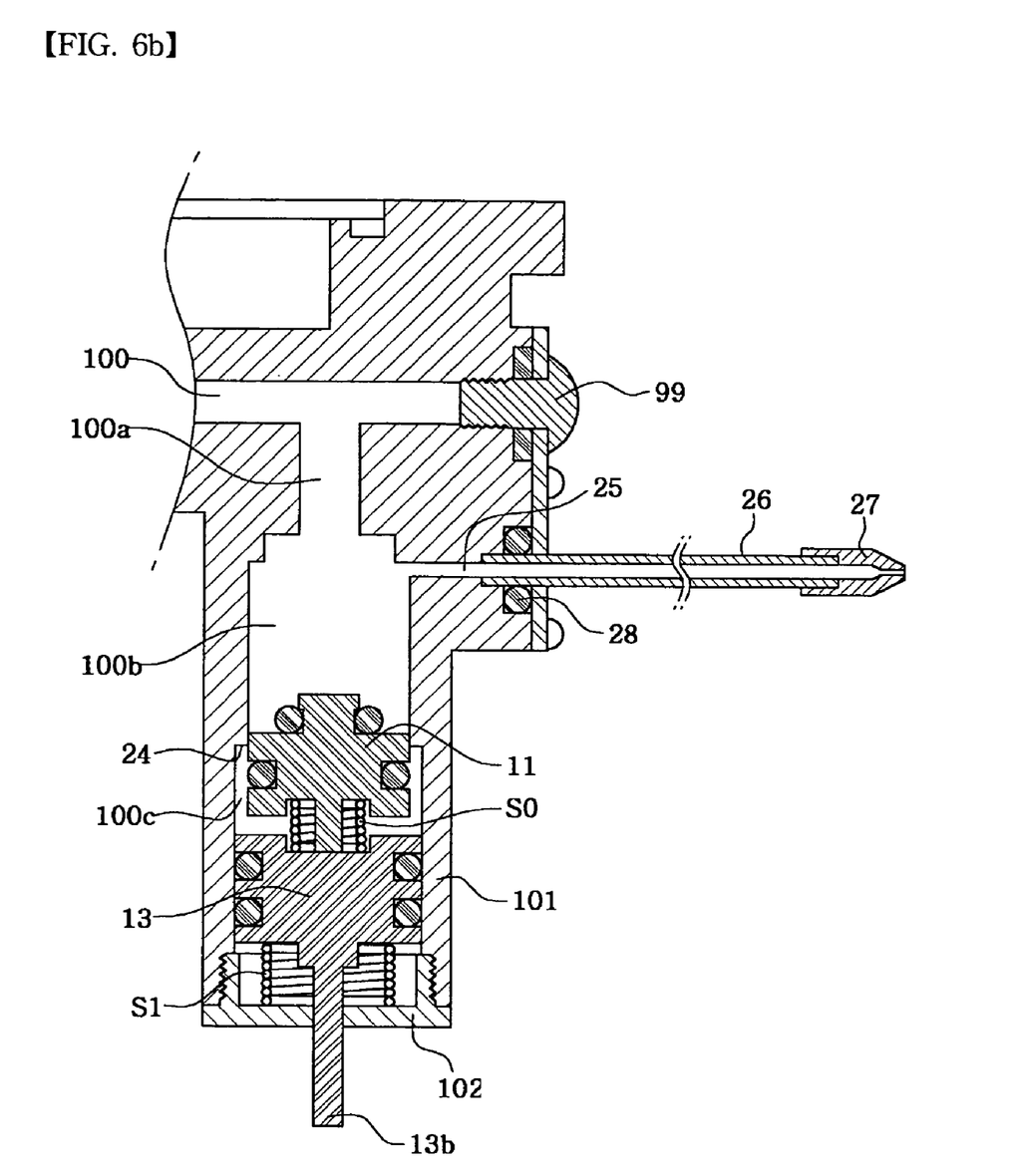
Figure 7:
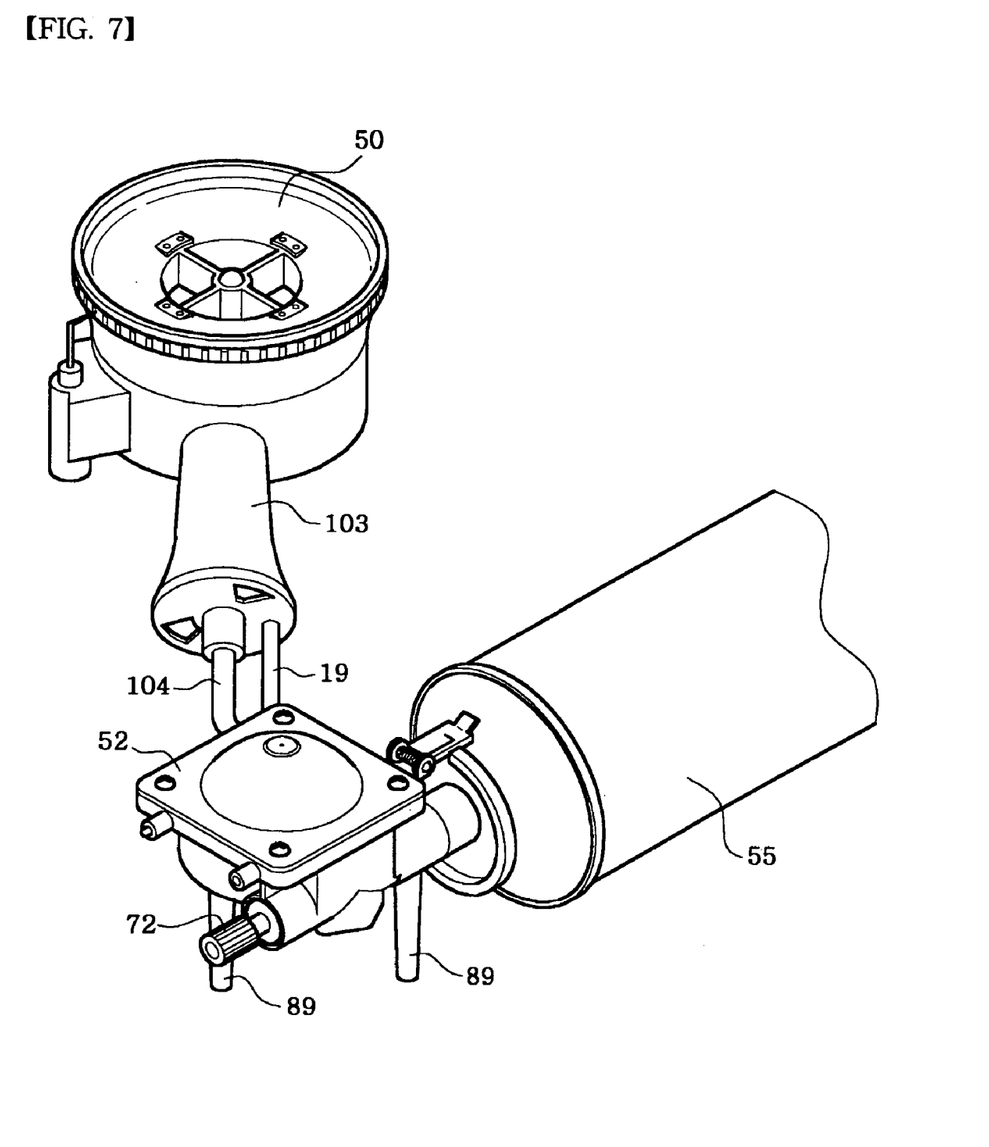
FIG. 7 is a perspective view illustrating a main part of a portable gas range according to a preferred embodiment of the present invention.

As shown in FIGS. 5 through 7, the safety apparatus for the portable gas range according to the present invention includes a housing 101 having a through hole 100a connected to a lower portion of the gas flow path 100 formed in the regulator 52 and having a first internal path 100b and a second internal path 100c each having a diameter larger than a diameter of the through hole 100a, in which the first and second internal paths are perpendicular to the adjusting lever 72, a safety operating member 11 (primary safety apparatus) resiliently held at an upper portion of the first internal path 100b by a resilient spring S0, and a safety rod 13 (secondary safety apparatus) resiliently held in the second internal path 100c by a resilient spring S1 and spaced apart from the safety operating member 11 by the resilient spring S0.

A disc-shaped cap 102 is threadedly engaged to a lower surface of the housing 101, and is provided at a lower center thereof with a hole (not shown) through which the safety rod 13 protrudes outwardly at given gas pressure.

The safety operating member 11 includes a first abutting portion 11a having an outer diameter corresponding to an inner diameter of the through hole 100a to closely contact an outer periphery of the through hole 100a, and a second abutting portion 11b formed integrally with an lower end portion of the first abutting portion 11a and having an outer diameter corresponding to an inner diameter of the internal path 100b, in which a vertically protruding portion 11c is formed at a bottom of the second abutting portion for receiving the resilient spring S0.

The first and second abutting portions 11a and 11b have on an outer periphery thereof first and second grooves 14 and 15, respectively. First and second O-rings 16 and 17 are inserted into the first and second grooves 14 and 15, respectively.

The gas discharging path 25 communicates with the first internal path 100b which is formed having a first stepped portion 19 at an upper portion of an inlet of the gas discharging path 25. The first stepped portion 19 has a groove 18 of a width wider than that of the through hole 100a but narrower than that of the first internal path 100b. The first O-ring 16 inserted onto the outer periphery of the first abutting portion 11a is received into the circular groove 18 when operating member 11 is in the position shown by FIG. 5. An upper end portion of the second abutting portion 11b of the safety operating member 11 then abuts the first stepped portion 19.

The reason why the first O-ring 16 is inserted into the circular groove 18 is that after the safety operating member 11 is lowered by the given gas pressure and then is returned to its original position by a restoring force of the resilient spring S0, the upper end portion of the second abutting portion 11b abuts the stepped portion 19, to apply a pressure to the first O-ring 16 inserted into the first abutting portion 11a at a constant level and thereby to prevent deformation of the first O-ring 18.

The safety rod 13 includes a head portion 13a closely fitting the second internal path 100c which is wider than the first internal path 100b. The safety rod 13 also has a groove 13c formed on an upper end portion thereof, and a shaft 13b vertically protruded from a bottom of the head portion 13a. A distal end of the resilient spring S0 installed on the bottom of the safety operating member 11 is seated on the groove 13c. Airtight third and fourth O-rings 22 and 23 are inserted into the third and fourth grooves 20 and 21 spaced apart from each other at a given interval, as the safety operating member 11.

In particular, since the safety rod 13 is held by the resilient spring S1 (having a resilient force higher than that of the resilient spring S0), the upper end portion of the safety rod could closely abut against the lower end portion of the second abutting portion 11b. In order to prevent such abutment, a second stepped portion 24 is formed on an interface between the first and second paths 100b and 100c, such that when the upper end portion of the safety rod 13 abuts against the second stepped portion 24 and it does not make contact with the lower end portion of the safety operating member 11.

The resilient spring S0 is adapted to be compressed when the gas pressure is increased to a gas pressure P0 just below a gas pressure P1 of 5 kg/cm$^2$ to 7 kg/cm$^2$ (4 kg/cm$^2$ to 6 kg/cm$^2$ for Japan), which is no more than an explosion critical pressure, i.e., when the gas pressure reaches a value more than 3 kg/cm$^2$ or less than 5 kg/cm$^2$ (a value more than 2 kg/cm$^2$ or less than 4 kg/cm$^2$ for Japan), and to have a resilient force lower than that of the resilient spring S1. As such, when a pressure of the gas introduced from the gas flow path 100 is higher than the resilient force of the resilient spring S0, the safety operating portion member 11 (primary safety apparatus) is lowered (that is, moved in a downward direction according to the orientation shown in the figures) by the gas pressure P0 which is higher than a charge pressure (2 kg/cm$^2$ 3 kg/cm$^2$) of the canister and is lower than the gas pressure P1, while the safety rod 13 (secondary safety apparatus) is lowered by the gas pressure P1 which is higher than the gas pressure P0 and the resilient force of the first resilient spring S1, so that an end portion of the safety rod protrudes outwardly from the housing 101.

A gas discharging path 25 opened/closed by the safety operating member 11 horizontally extends through one side wall of the housing 101 contacted the second abutting portion 11b of the safety operating 11, such that the gas supplied to the path 100a and the first internal path 100b through the gas flow path 100 is discharged to the burner.

Preferably, the gas discharging path 25 is formed on one side wall of the housing 101 and is disposed such that when the safety operating member is in the position shown in FIG. 5, the discharge path is located between the first O-ring 16 disposed on the outer periphery of the first abutting portion 11a and the second O-ring 17 disposed on the outer periphery of the second abutting portion 11b.

The gas discharging path 25 is closed by the safety operating member 11 when the burner is operating in a normal combustion state, i.e., when the resilient force of the resilient spring S0 is higher than the gas pressure in the gas flow path 100. However, the gas discharging path 25 is opened by the safety operating member 11 which is moved by a distance corresponding to a compressed degree of the resilient spring S0 due to the gas pressure, when the gas pressure is higher than the resilient force of the resilient spring S0.

As shown in FIGS. 5–7, the gas discharging path 25 is connected to the auxiliary gas discharging pipe 26 to communicate with the air mixing pipe 103. The auxiliary gas discharging pipe 26 is a general copper pipe. One end of the auxiliary gas discharging pipe 26 is connected to a gas outlet (not shown) formed at a lower portion of the regulator 52, and the other end is connected to a center portion of the air mixing pipe 103. In addition, the auxiliary gas discharging pipe 26 is connected in parallel with the main gas discharging pipe 104 for supplying the gas to the burner, so as to implement the normal combustion state. A nozzle 27 is engaged to a front end of the auxiliary gas discharging pipe 26.

Preferably, the nozzle 27 has a diameter as small as possible. If the diameter of the nozzle is large, a mass of pressurized gas is supplied to the burner 50 through the auxiliary gas discharging pipe 26, thereby causing a fire. For example, the diameter of the nozzle is within a range of 0.1 to 0.4 mm, more preferably, 0.15 to 0.35 mm.

In particular, when the canister is overheated due to external thermal heat, the safety operating member according to the present invention is adapted to operate immediately before an internal pressure is increased to a danger pressure. Accordingly, in the case where the gas range is used in cold weather or area, since the canister is hardly heated due to a surrounding low temperature, the safety operating member 11 may not operate.

In this case, since the gas discharging path 25 is closed by the safety operating member 11, the gas introduced into the gas flow path of the regulator from the canister is supplied to the burner through the main gas discharging pipe 104.

The auxiliary gas discharging pipe 26 displaced between the gas discharging path 25 and the air mixing pipe 103 serves to supply the gas to the burner from the regulator only when the safety operating member operates. At this time, the auxiliary gas discharging pipe 26 has a function of adjusting a thermal power, like as the main gas discharging pipe 104.

Reference numeral 28 denotes an O-ring inserted on an outer periphery of the auxiliary gas discharging pipe 26 installed in the gas discharging path 25 for airtight, and 99 denotes a bolt fastened for covering an end portion of the gas flow path 100.

Operation of the safety apparatus according to the present invention will now be described with reference to FIGS. 5 to 7.

First, when the canister 55 is mounted to the gas inlet 70 of the regulator 52, the gas discharged from the canister 55 is supplied to the gas flow path 100 through the gas inlet 70. In this state, the gas pushes the needle valve 88 opening/closing a nozzle hole formed on an upper portion of the gas flow path 100 to be supplied into the chamber 71.

The gas supplied to the chamber 71 is supplied to the burner 50 via the gas outlet formed on a lower portion by the regulating valve 72 to be ignited. At this time, a cooking appliance seated on the burner 50 is heated, and radiant heat generated from a bottom of the appliance is transferred to the canister. If the radiant heat is large, the internal pressure of the canister is thus increased.

If the internal pressure of the canister is increased, the amount of the gas supplied to the regulator 52 is increased, and a mass of gas is also supplied to the chamber 71, thereby rising the pressure in the chamber 71. Consequently, the needle valve 88 operates to repeatedly open and close the nozzle hole 83, to maintain the gas pressure discharged from the regulator 52 at a constant level. At this time, if an expanding pressure of the canister is higher than the constant pressure discharged from the regulator 52, the internal pressure of the canister is rapidly increased.

As such, when the internal pressure of the canister reaches the gas pressure P0 (more than 3 kg/cm$^2$ or less than 5 kg/cm$^2$) just below a gas pressure P1 (5 kg/cm$^2$ to 7 kg/cm$^2$), which is no more than the explosion critical pressure, the safety operating member 11 compresses the resilient spring S0 by the pressure and it assumes the position shown in FIG. 6A.

At this time, the gas discharging path 25 previously closed by the safety operating member 11 is opened, and then the gas in the gas flow path 100 is discharged into the air mixing pipe 103 via the auxiliary gas discharging pipe 26 connected to the gas discharging path 25. The discharged gas is supplied to the burner 50 for combustion.

After discharging the gas via the gas discharging path 25 to a certain degree, the internal pressure of the canister 55 is lowered below a predetermined level, in other words, the canister is maintained in or returned to a low pressure state. The lowered safety operating member 11 is pushed up by the resilient force of the compressed resilient spring S0 to close the gas discharging path 24. Thus, the gas range is returned to a normal combustion state, in which the gas is supplied only through the main gas discharging pipe 104.

The above process is continuously repeated until the internal pressure of the canister is increased to the pressure P1 of 5 kg/cm$^2$ to 7 kg/cm$^2$.

Through such a repeated process, if the canister 55 is overheated due to the radiant heat and thus the internal pressure increases to the pressure P1, the safety operating member 11 is lowered against the resilient force of the resilient springs S0 and S1 to lower the safety rod 13. The lower end portion of the lowered safety rod 13 protrudes outwardly through the hole of the lower cap 12.

As such, the releasing lever (61) (see FIG. 2) is pushed by the protruding lower end portion of the safety rod 13, such that the canister 55 is automatically detached from the gas inlet of the regulator 52 to completely interrupt the supply of the gas.

With the above description, when the canister is overheated by the radiant heat in use and thus the internal pressure of the canister reaches a predetermined pressure (more than 3 kg/cm$^2$ or less than 5 kg/cm$^2$) just below a level of 5 kg/cm$^2$ to 7 kg/cm$^2$, a desired amount of gas is discharged from the canister to the burner for combustion of the gas by operating the safety operating member (preliminary safety apparatus), thereby preventing overheating of the canister and also improving a thermal efficiency of the gas range using the combustion of the gas. In addition, if the internal pressure of the canister is rapidly increased to a level higher than the pressure of the gas discharged into the burner, the canister is automatically detached from the gas inlet by operating the safety rod as subsequent safety measures, thereby obviating explosion of the canister.

This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

What is claimed is:

1. A safety apparatus for a portable gas range, the safety apparatus comprising: a housing connected to one side of a gas flow path in a regulator, the housing having an internal path communicating with a through hole connected to a lower portion of a gas flow path in the regulator; a safety rod resiliently held in the internal path by a first resilient spring, in which when an internal pressure of a gas canister increases to a danger pressure P1, an end portion of the safety rod is caused to protrude outwardly through a hole formed at a lower portion of the housing; and a safety operating member installed between a through hole and an upper portion of the safety rod, resiliently supported by a second resilient spring having a resilient force lower than that of the first resilient spring, and operated by a gas pressure higher than a charge pressure of the canister and lower than the danger gas pressure.

2. The safety apparatus according to claim 1, wherein the internal path is divided into a first internal path wider than the through hole and a second internal path wider than the first internal path.

3. The safety apparatus according to claim 2, wherein the safety operating member includes a first abutting portion having an outer diameter corresponding to an inner diameter of the through hole to closely contact an outer periphery of the through hole, and a second abutting portion formed integrally with a lower end portion of the first abutting portion and having an outer diameter corresponding to an inner diameter of the internal path, in which a vertically protruding portion is formed at a bottom of the second abutting portion for receiving the second resilient spring.

4. The safety apparatus according to claim 1, wherein the safety operating member includes a first abutting portion having an outer diameter corresponding to an inner diameter of the through hole to closely contact an outer periphery of the through hole, and a second abutting portion formed integrally with a lower end portion of the first abutting portion and having an outer diameter corresponding to an inner diameter of the internal path, in which a vertically protruding portion is formed at a bottom of the second abutting portion for receiving the second resilient spring.

5. The safety apparatus according to claim 4, wherein the first and second abutting portions are provided on an outer periphery thereof with first and second grooves, respectively, and first and second O-rings are inserted into the first and second grooves, respectively.

6. The safety apparatus according to claim 1, wherein an inlet of the gas discharging path is disposed between a first O-ring inserted on an outer periphery of the first abutting portion and a second O-ring inserted on an outer periphery of the second abutting portion.

7. The safety apparatus according to claim 6, wherein the gas discharging path is formed with a first stepped portion at an upper portion of the inlet of the gas discharging path, and an upper end portion of the second abutting portion abuts the first stepped portion.

8. The safety apparatus according to claim 1, wherein the gas discharging path is formed with a first stepped portion at an upper portion of the inlet of the gas discharging path, and an upper end portion of the second abutting portion abuts the first stepped portion.

9. The safety apparatus according to claim 1, wherein the safety rod is formed at an upper end portion thereof with a groove for receiving a distal end portion of the second resilient spring supported on a bottom of the second abutting portion of the safety operating member.

10. The safety apparatus according to claim 9, wherein a second stepped portion is formed on an interface between the first and second paths, such that the upper end portion of the safety rod abuts against the second stepped portion.

11. The safety apparatus according to claim 1, wherein the gas discharging path is opened by the safety operating member moved downwardly due to said gas pressure, when an internal pressure of a canister reaches said gas pressure.

12. In a safety apparatus for a portable gas range including a burner with an igniter; a gas inlet for connecting a canister; a regulator having a main gas discharging pipe for discharging a gas supplied from the gas inlet to the burner; an air mixing pipe disposed between the burner and the main gas discharging pipe of the regulator; a housing vertically formed on a lower portion of the regulator and having an internal path communicating with a through hole connected to a lower portion of the gas flow path in the regulator; a safety rod resiliently installed in the internal path by a resilient spring S1, in which when an internal pressure of the canister is increased to a danger pressure range P1 no more than an explosion critical pressure, an end portion of the safety rod protrudes outwardly through a hole formed at a lower portion of the housing by the gas pressure P1; and a device having a releasing lever pivoted around the safety rod to detach the canister, a method for operating the safety apparatus, wherein a) when the internal pressure of the canister reaches a range of gas pressure, P0, which is above a highest level of a normal gas pressure and below a lowest level of a danger pressure, and which is higher than a charge pressure of the canister and lower than a gas pressure P1, a safety operating member resiliently installed between the through hole and an upper portion of the safety rod by a resilient spring S0 is moved down by the gas pressure P0, such that the through hole is opened to communicate with the internal path;

b) a gas discharging path formed on one side wall of the housing with the safety operating member installed thereto and opened/closed by the safety operating member is opened according to descent of the safety operating member;

c) when the gas of gas pressure P0 supplied to the internal path through the gas flow path and the through hole is discharged through the gas discharging path, the gas is supplied to the burner by an auxiliary gas discharging pipe disposed between the gas discharging path and the air mixing pipe for combustion thereof, so that the internal pressure of the canister is maintained at a low pressure state; and d) when the internal pressure of the canister rapidly increases to the gas pressure P1 higher than the gas pressure P0 discharged through the auxiliary gas discharging pipe due to continuous radiant heat, the safety operating member is moved down by the gas pressure P1, and the safety rod resiliently installed to a bottom of the safety operating member by a spring S1 is moved down, such that a distal end portion of the safety rod protrudes outwardly through the hole formed at the lower portion of the housing to detach the canister from the gas inlet by operating the releasing lever and thus to interrupt gas supply.

13. The method according to claim 12, wherein the internal pressure of the canister is maintained at a low pressure by combustion of the gas, the lowered safety operating member is returned to its original safety position by a restoring force provided by compressed resilient spring S0 to close the gas discharging path, and the gas in the canister is supplied to the burner through the main gas discharging pipe.

14. The method according to claim 12, wherein until the internal pressure of the canister explosion critical pressure, the steps a through c are continuously repeated.

* * * * *